US005095066A

United States Patent [19]

Meixner et al.

[11] Patent Number: 5,095,066

[45] Date of Patent: Mar. 10, 1992

[54] HYDROPHILIC POLYURETHANES CONTAINING (METH)ACRYLOYL GROUPS, THEIR USE AS REACTIVE EMULSIFIERS FOR RADICALLY CURABLE SYNTHETIC RESINS, WATER-DISPERSIBLE MIXTURE OF RADICALLY CURABLE SYNTHETIC RESINS AND AN AQUEOUS COATING COMPOSITION BASED ON THIS MIXTURE

[75] Inventors: Jürgen Meixner, Krefeld; Josef Pedain, Cologne; Wolfgang Fischer, Meerbusch, all of Fed. Rep. of Germany

[73] Assignee: Bayer Aktiengesellschaft, Leverkusen, Fed. Rep. of Germany

[21] Appl. No.: 456,539

[22] Filed: Dec. 26, 1989

[30] Foreign Application Priority Data

Jan. 6, 1989 [DE] Fed. Rep. of Germany ....... 3900257

[51] Int. Cl.[5] .............................................. C08L 75/04

[52] U.S. Cl. .................................... 524/500; 524/591; 523/335

[58] Field of Search ................. 524/591, 500; 523/335

[56] References Cited

FOREIGN PATENT DOCUMENTS 0021824 6/1980 European Pat. Off. .
0154237 2/1985 European Pat. Off. .
0168173 2/1985 European Pat. Off. .
0287736 12/1987 European Pat. Off. .
3437918 4/1984 Fed. Rep. of Germany .

*Primary Examiner*—John Kight, III
*Assistant Examiner*—Shelley A. Wright
*Attorney, Agent, or Firm*—Connolly & Hutz

[57] ABSTRACT

A polyurethane is disclosed having improved properties as a reactive emulsifier for radically-curable synthetic resins. The polyurethane is obtained by the reaction of a) a polyisocyanate component; b) an alcohol component; and c) a polyethylene glycol component. The reactive emulsifiers are useful in aqueous coating compositions.

2 Claims, No Drawings

HYDROPHILIC POLYURETHANES CONTAINING (METH)ACRYLOYL GROUPS, THEIR USE AS REACTIVE EMULSIFIERS FOR RADICALLY CURABLE SYNTHETIC RESINS, WATER-DISPERSIBLE MIXTURE OF RADICALLY CURABLE SYNTHETIC RESINS AND AN AQUEOUS COATING COMPOSITION BASED ON THIS MIXTURE

This invention relates to certain nonionic-hydrophilic polyurethanes containing (meth)acryloyl groups, to their use as reactive emulsifiers for radically curable synthetic resins in the production of aqueous synthetic resin dispersions, to a water-dispersible mixture of polyurethanes containing (meth)acryloyl groups containing these nonionic-hydrophilic polyurethanes as emulsifier component and to a coating composition of which the binder consists essentially of this mixture.

Water-dispersible urethane acrylates are already known (cf. for example EP-A 00 98 752 or DE-OS 2 936 039). The hydrophilic character of these known systems is attributable to the presence of ionic centers, particularly carboxylate or sulfonate groups, containing as counterions alkali cations or ammonium cations which remain in the coatings ultimately obtained from the systems and seriously impair their resistance to water. In addition, the amines often present can cause yellowing of the paint coatings while the auxiliary solvents present, if any, can cause environmental pollution during the drying process.

Another possibility of obtaining water-dilutable products is to use external emulsifiers. Thus, according to U.S. Pat. No. 4,070,323 for example, polyurethanes containing acryloyl groups are dispersed in water using anionic or cationic oil-in-water emulsifiers (for example sodium lauryl sulfate). These emulsifiers are not incorporated in the paint film during the radical crosslinking reaction. As a result, the degree of water resistance which the paint films are capable of achieving is considerably reduced.

Accordingly, the object addressed by the present invention is to find reactive emulsifiers for radically curable synthetic resins which have few, if any, of the disadvantages attending known emulsifiers.

This problem is solved by the provision of the reactive emulsifiers according to the invention which are described in detail hereinafter.

The present invention relates to polyurethanes having a content of (i) olefinic double bonds (expressed as $=C=C=$, molecular weight $=24$) of at least 1.0% by weight and (ii) ethylene oxide units incorporated through polyethylene glycol of from 20 to 80% by weight which have been obtained by reaction of a) 1.0 mol of a polyisocyanate component consisting of at least one organic polyisocyanate with b) 0.9 to 2.5 mol of an alcohol component containing (meth)acryloyl groups and consisting of at least one monohydric alcohol containing (meth)acryloyl groups and subsequent reaction of the reaction product formed from a) and b) with c) 0.25 to 0.55 mol of a polyethylene glycol component consisting of at least one polyethylene glycol at an NCO:OH equivalent ratio, based on all the starting components a) to c), maintained at 0.7:1 to 1.1:1.

The present invention also relates to the use of polyurethanes having a content of (i) olefinic double bonds (expressed as $=C=C=$, molecular weight $=24$) of at least 1.0% by weight and (ii) ethylene oxide units incorporated through polyethylene glycol of from 20 to 80% by weight which have been obtained by reaction of a) 1.0 mol of a polyisocyanate component consisting of at least one organic polyisocyanate with b) 0.9 to 2.5 mol of an alcohol component containing (meth)acryloyl groups and consisting of at least one monohydric alcohol containing (meth)acryloyl groups and subsequent reaction of the reaction product formed from a) and b) with c) 0.25 to 0.55 mol of a polyethylene glycol component consisting of at least one polyethylene glycol at an NCO:OH equivalent ratio, based on all the starting components a) to c), maintained at 0.7:1 to 1.1:1, as reactive emulsifiers for radically curable synthetic resins non-dispersible in water in the production of aqueous synthetic resin dispersions.

The present invention also relates to a water-dispersible mixture of radically curable synthetic resins containing (meth)acryloyl groups, characterized in that it consists essentially of A) 50 to 95 parts by weight of at least one non-water-dispersible polyurethane containing at least 2.5% by weight olefinic double bonds (expressed as $\uparrow C \uparrow C \uparrow$, molecular weight 24) in the form of chemically incorporated (meth)acryloyl groups and having a molecular weight Mw in the range from 500 to 10,000 and B) 5 to 50 parts by weight of at least one polyurethane guaranteeing the dispersibility of the mixture in water and having a content of (i) olefinic double bonds (expressed as $=C=C=$, molecular weight $=24$) of at least 1.0% by weight and (ii) ethylene oxide units incorporated through polyethylene glycol of from 20 to 80% by weight which have been obtained by reaction of a) 1.0 mol of a polyisocyanate component consisting of at least one organic polyisocyanate with b) 0.9 to 2.5 mol of an alcohol component containing (meth)acryloyl groups and consisting of at least one monohydric alcohol containing (meth)acryloyl groups and subsequent reaction of the reaction product formed from a) and b) with c) 0.25 to 0.55 mol of a polyethylene glycol component consisting of at least one polyethylene glycol at an NCO:OH equivalent ratio, based on all the starting components a) to c), maintained at 0.7:1 to 1.1:1, with the proviso that the total content in the mixture of ethylene oxide units emanating from component c) is at most 20% by weight and preferably at most 15% by weight.

Finally, the present invention also relates to a coating composition which is characterized in that the binder consists essentially of a mixture of the type according to the invention.

The compounds according to the invention, i.e. the nonionic-hydrophilic polyurethanes to be used in accordance with the invention as emulsifiers, are essentially reaction products of the above-mentioned starting components a) to c), from 1.0 to 2.2 mol component b) and from 0.4 to 0.5 mol component c) preferably being used per mol component a) in the production of the polyurethanes.

Component a) consists of at least one organic polyisocyanate. Suitable polyisocyanates are any organic polyisocyanates known per se from polyurethane chemistry containing aliphatically, cycloaliphatically and/or aromatically bound isocyanate groups which preferably have a molecular weight in the range from 168 to 1,000 and preferably in the range from 168 to 300. Suitable organic polyisocyanates are, for example, 1, 6-diisocyanatohexane (HDI), 1-isocyanato-3, 3, 5-trimethyl-5-isocyanatomethyl cyclohexane (IPDI), 4, 4'-diisocyanatodicyclohexylmethane,4, 4'-diisocyanatodiphenyl methane, technical mixtures thereof with 2, 4-diisocyanatodiphenyl methane and, optionally, the higher homologs of these diisocyanates, 2, 4-diisocyanatotoluene and mixtures thereof with 2, 6-diisocyanatotoluene.

Biuret-, isocyanurate- or urethane-modified polyisocyLe anates based on these simple polyisocyanates are also suitable. These derivatives generally have a molecular weight of up to 1,000. The production of such derivatives is described, for example, in U.S. Pat. Nos. 3,124,605, 3,183,112, 3,919,218 or U.S. Pat. No. 4,324,879.

Component b) is selected from monohydric alcohols containing (meth)acryloyl groups or from mixtures of such alcohols which are understood to be esters of (meth)acrylic acid with polyhydric alcohols containing on average one free hydroxyl group per molecule. The esters have a number average molecular weight in the range from 116 to 1,000 and preferably in the range from 116 to 750. Examples of ethylenically unsaturated partial esters such as these are hydroxyethyl (meth)acrylate, 2- and 3-hydroxypropyl (meth)acrylate, 2-, 3- and 4-hydroxybutyl (meth)acrylate and reaction products of (alkoxylated) trimethylol propane with (meth)acrylic acid such as, for example, the reaction product of 2 mol acrylic acid and 1 mol of an ethoxylated trimethylol propane (OH value 550, degree of ethoxylation approx. 4).

Component c) is selected from linear polyethylene glycols having a number average molecular weight in the range from 400 to 4,000 and preferably in the range from 600 to 2,000, in which at least 80% and preferably 100% of the alkylene oxide units are ethylene oxide units. Accordingly, the expression "polyethylene glycols" is understood to encompass not only genuine polyethylene glycols, of which the alkylene oxide units consist solely of ethylene oxide units, but also polyalkylene glycols in which the alkylene oxide units dominate, i.e. in which at least 80% of the alkylene oxide units are ethylene oxide units. "Mixed" polyalkylene glycols such as these are formed, for example, through the use of mixtures of different alkylene oxides, for example ethylene oxide and propylene oxide in a molar ratio of $\geqq 8:1$, in the production of the polyether glycols by alkoxylation of suitable difunctional starter molecules, such as for example water, ethylene glycol or propylene glycol. However, component c) preferably consists of pure polyethylene glycols.

The production of the hydrophilic polyurethanes according to the invention to be used as emulsifiers may be carried out in bulk or in solvents inert to isocyanate groups, such as for example acetone, methyl ethyl ketone, ethyl acetate, butyl acetate, toluene, low molecular weight esters of (meth)acrylic acid or mixtures of such solvents, the reaction temperatures preferably being in the range from 20° to 100° C. and more preferably in the range from 20° to 80° C. In this reaction, from 0.9 to 2.5 mol and preferably from 1.0 to 2.2 mol component b) and from 0.25 to 0.55 mol and preferably from 0.4 to 0.5 mol component c) are used per mol component a), the reaction between component a) and component b) having to be carried out first in a first reaction step, after which the reaction product obtained is reacted with component c).

In practice, therefore, the polyisocyanate may be initially introduced and reacted with the unsaturated monoalcohol b) under mild conditions, for example at a temperature in the range mentioned above, followed by reaction with the polyethylene glycol c), again at a temperature in the range mentioned above, until the NCO content has fallen to below 0.1% by weight. Basically, the nature of and quantitative ratios between the starting components are selected within the ranges mentioned so that, based on components a) to c), and NCO:OH equivalent ratio of 0.7:1 to 1.1:1 is guaranteed.

The urethanization reactions may be catalyzed iD known manner, for example with tin octoate, dibutyltin dilaurate or tertiary amines. The urethane acrylate may also be protected against premature and unwanted polymerization by addition of suitable inhibitors and antioxidants in a quantity of 0.001 to 0.3% by weight, based on the mixture as a whole.

The hydrophilic polyurethanes containing (meth)acryloyl groups obtained in this way have a weight average molecular weight Mw, as determined by gel permeation chromatography, in the range from 1,000 to 10,000 and preferably in the range from 1,500 to 5,000, a content of olefinic double bonds (expressed as =C=C=, molecular weight =24) of at least 1.0% by weight and preferably from 1.5 to 6.0% by weight and a content of ethylene oxide units $-CH_2-CH_2-O-$ incorporated through polyethylene glycol in the range from 20 to 80% by weight and preferably in the range from 30 to 75% by weight.

The hydrophilic polyurethanes are valuable emulsifiers for hydrophobic, non-water-dispersible, radically cross-linkable synthetic resins, more especially for hydrophobic polyester resins containing (meth)acryloyl groups and more preferably for polyurethane resins containing (meth)acryloyl groups.

Hydrophobic polyurethane resins containing (meth)acryloyl groups, which may be combined with the hydrophilic polyurethanes mentioned to form the water-dispersible mixtures according to the invention, are in particular, water-dispersible polyurethanes which have a weight average molecular weight Mw, as determined by gel permeation chromatography, in the range from 500 to 10,000 and preferably in the range from 1,000 to 5,000, a content of olefinic double bonds (expressed as =C=C=, molecular weight =24) in the form of chemically incorporated (meth)acryloyl groups of at least 2.5% by weight and preferably from 3 to 15% by weight and a content of ethylene oxide units incorporated through polyethylene glycols of at most 5% by weight. In general, these hydrophobic polyurethanes are clear color-less liquids which, in the absence of solvents, have a viscosity at 23° C. in the range from 10 to a few thousand Pa.s or are even solid at room temperature.

Polyurethanes such as these are produced by the reaction known per se of organic polyisocyanates of the type mentioned by way of example above under a) with hydroxyl-containing esters of acrylic or methacrylic acid of the type mentioned by way of example above under b) and, optionally, other synthesis components containing isocyanate-reactive groups.

Synthesis components of the last-mentioned type include simple polyhydric alcohols having a molecular weight in the range from 62 to 400, such as for example ethylene glycol, propylene glycol, the isomeric butanediols of hexanediols, glycerol, trimethylol propane, diethylene glycol, triethylene glycol, dipropylene glycol; the polyether polyols known per se from polyurethane chemistry which may be obtained in known manner by alkoxylation of simple alcohols of the type mentioned by way of example and which have molecular weights of up to 2,000 and preferably of up to 1,000; the polyester polyols known per se from polyurethane chemistry which may be obtained in known manner by reaction of the polyhydric alcohols mentioned by way of example with polybasic acids or anhydrides of polybasic acids, such as for example adipic acid, phthalic acid, phthalic anhydride, tetrahydrophthalic acid or tetrahydrophthalic anhydride; also sulfur-containing polyols of the type mentioned by way of example in DE-OS 2 737 406, such as in particular thiodiglycol.

To produce the hydrophobic polyurethanes, the starting materials mentioned by way of example are reacted in any order in an equivalent ratio of isocyanate groups to isocyanate-reactive groups of 0.7:1 to 1.1:1, again preferably at reaction temperatures in the range from 20 to 100° C. and more preferably at reaction temperatures in the range from 20 to 80° C. The auxiliaries mentioned above may again be used.

The water-dispersible mixtures according to the invention contain from 50 to 95 parts by weight and preferably from 70 to 95 parts by weight of the hydrophobic polyurethanes mentioned in admixture with 5 to 50 parts by weight and preferably 5 to 30 parts by weight of the above-mentioned hydrophilic polyurethanes acting as emulsifiers. It is, however, important to select the ingredients of the mixtures and their amount so that the total content of the water-dispersible mixture of ethylene oxide units emanating from component c) is at most 20 % by weight and preferably at most 15 % by weight.

The mixtures may be prepared simply by mixing the individual components, optionally in the presence of inert solvents of the type mentioned by way of example above.

To prepare the aqueous coating compositions according to the invention, the mixtures according to the invention are dispersed in water which may be done, for example, simply by stirring water into a mixture of the polyurethanes using standard dissolvers.

To form a finely divided emulsion, it is of advantage to add water in portions at temperatures below 40° C. Stable oil-in-water emulsions may be obtained in this way.

The aqueous dispersions obtained in this way are valuable aqueous binders for coating compositions. They may be used as such or in combination with the auxiliaries and additives known from paint technology such as, for example, fillers, pigments, solvents, flow control agents and the like for the production of coatings on any substrates.

Suitable substrates are paper, carton, leather, wood, plastics, nonwovens, textiles, ceramic materials, mineral materials, glass, metals, artificial leather and photographic materials, such as for example paper coated with a photographic layer.

The coating compositions may be applied in known manner by spray coating, knife coating, roll coating, spread coating, dip coating or casting. After evaporation of the water and any inert solvents used, the coatings may be crosslinked either by high-energy radiation, such as UV light, electron beams or gamma rays, or by hardening with metal salts of siccative acids and (hydro)peroxides at temperatures in the range from 80° C. to 250° C.

Where the coatings are crosslinked by UV irradiation, photoinitiators have to be added to the coating compositions.

Suitable photoinitiators are the compounds typically used, as described for example in the book by J. Korsar entitled Light-Sensitive Systems, J. Wiley & Sons, New York —London—Sydney, 1965.

Other suitable photoinitiators are benzoin ethers, such as benzoin isopropyl ether, benzil ketals, such as for example benzil dimethyl ketal, and hydroxyalkyl phenones, such as for example 2-hydroxy-2-methyl-1-phenyl-propan-1-one.

The photoinitiators mentioned above which are used in quantities of from 0.1 to 10% by weight and preferably in quantities of from 0.1 to 5% by weight, based on the weight of the dispersed hydrophilic and hydrophobic polyurethanes, depending on the application envisaged for the compounds according to the invention, may be used either individually or, by virtue of frequent advantageous synergistic effects, even in combination with one another.

The metal salts of siccative acids used where crosslinking is carried out with peroxides are, for example, cobalt, lead and manganese salts of such acids as linseed oil fatty acids, tall oil fatty acids, soybean oil fatty acids, of resinic acids, such as abietic acid and naphthenic acid or of acetic acid and isooctanoic acid. They are used in the form of organic solutions in such quantities that the metal content, based on the weight of the dispersed hydrophilic and hydrophobic polyurethanes, corresponds to between 0.005 and 1% by weight.

Examples of (hydro)peroxides are di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2, 5-dimethyl hexane-2, 5-hydroperoxide and diisopropyl benzene monohydroperoxide. These (hydro)peroxides are preferably used in quantities of 1 to 10% by weight, based on the weight of the dispersed hydrophilic and hydrophobic polyurethanes.

In the following Examples, all percentages are by weight.

EXAMPLES

Production of starting materials

Hydrophobic polyurethane A1:

A polyurethane containing acryloyl groups is prepared by reaction of 111 g (0.5 mol) isophorone diisocyanate with 46.4 g (0.4 mol) hydroxyethyl acrylate, 6.1 g (0.05 mol) thiodiglycol and 134 g (0.2 mol) of an ethoxylated trimethylol propane having an OH value of 250 (molecular weight 675).

After the entire quantity of isocyanate had been introduced, the higher diglycol was added dropwise while cooling and stirring over a period of 2 hours at 40 to 50° C. The reaction temperature should not exceed 60° C. during the addition. After the addition of 0.1 g tin octoate and 0.15 g benzoquinone and while air is passed over, the hydroxyethyl acrylate is introduced dropwise with cooling at 50° to 60° C. at such a rate that the temperature does not exceed 65° C. After an NCO value of approximately 14% has been reached (approx. 4 h), the ethoxylated trimethylol propane is added dropwise.

The mixture is stirred at 60° C. while dry air is passed over until the NCO value is 0.1% by weight. A colorless and odorless resin of medium viscosity (viscosity of a 90% solution in butyl acetate: approx. 15 Pa.s/23° C.) containing 3.2% by weight olefinic double bonds (molecular weight 24) is obtained.

Hydrophobic polyurethane A2;

A partial ester containing OH groups and acryloyl groups is initially prepared by azeotropically esterifying a propoxylated trimethylol propane (OH value =550 (mg KOH/g)) with acrylic acid.

925 g (3.0 mol) propoxylated trimethylol propane are heated with 430 g (6.0 mol) acrylic acid, 12 g p-toluene sulfonic acid, 1 g p-methoxyphenol, 1.2 g di-tert.-butyl hydroquinone and 280 g toluene to the reflux temperature while air is passed through and the water of reaction formed is azeotropically removed. After an acid value below 3 (mg KOH/g substance) has been reached, the solvent is removed in vacuo and the product is clarified by filtration An OH-group-containing ethylenically unsaturated partial ester having the following characteristic data is obtained:

Acid value: 2

OH value : 115

The intermediate product mentioned above is then reacted with 2, 4-diisocyanatotoluene:

174 g (1.0 mol) 2, 4-diisocyanatotoluene and 0.7 g-methoxyphenol are introduced into a stirred reactor while dry air is passed over and heated to 40°-65° C. 980 g of the intermediate product mentioned above are then added over a period of about 2 hours, followed by stirring at the stated temperature until the NCO value is below 0.1% by weight. The hydrophobic acrylate prepolymer A2 has a viscosity of 46 Pa.s (23° C.). The content of olefinic double bonds is 9.7% by weight.

Hydrophobic polyurethane A3

An isocyanurate polyisocyanate based on hexamethylene diisocyanate (HDI) is initially prepared.

1 ml 2-dimethylaminomethyl nonylphenol is added to 1344 g (8.0 mo)) HDI at 23° C. After stirring for 5 minutes, 40 ml of a 2% solution of 2-hydroxyethyl trimethyl ammonium hydroxide in dimethyl formamide/-methanol (8:1) are added dropwise over a period of 15 minutes, again at 23° C.

Over this period, the temperature rises to 35° C. and, after another 45 minutes, to 40° C. The trimerization reaction is maintained at that temperature. After 6 hours, an NCO content of 40.5% is reached. The reaction product is stabilized with 0.3 ml monofluorobutane sulfonic acid in 1 ml dimethyl formamide and then subjected to thin-layer distillation in a high vacuum.

Iodine color value: 3

NCO content : 22.0%

Viscosity (25° C.) : 3,100 mPa.s

The polyisocyanate obtained as described above is then reacted with hydroxyethyl acrylate to form the acrylate prepolymer A3:

283 g (0.5 mol) NCO of the polyisocyanate are dissolved in 365 parts anhydrous toluene and 174 g (1.5 mol) hydroxyethyl acrylate are added to the resulting solution at room temperature. After the addition of 0.5 g tin dioctoate, the temperature is slowly increased to 60° C. and the mixture is stirred until the NCO content has fallen to 0. After cooling to room temperature, 1.8 g 2, 6-di-t-butylphenol are added and solvent is removed by vacuum distillation until the concentration is 70%. The solution obtained is almost colorless with a slight yellow tinge and has a viscosity of approximately 5,000 mPa.s (23° C.). The content of olefinic double bonds is 7.9% by weight.

Hydrophobic polyurethane A4

116 g (1.0 mol) hydroxyethyl acrylate are added dropwise over a period of 2 hours with cooling and stirring to 222 g (1.0 mol) isophorone diisocyanate and 0.5 g hydroquinone monomethyl ether at such a rate that the temperature does not exceed 65° C. After the addition of 0.5 g tin dioctoate and 42 g butyl acetate, 38 g (0.5 mol) 1, 2-propanediol are added dropwise and the mixture is stirred at 60 to 70° C. until the NCO content has fallen to below 0.1% by weight. A colorless, almost solid substance having an olefinic double bond content of 6.4% by weight is obtained.

Hydrophilic polyurethanes B

The polyisocyanates shown in Table 1 are each heated to 50-60° C. with 0.1% hydroquinone monomethyl ether. The particular monoalcohol containing acryloyl groups is then added dropwise with stirring at such a rate that the temperature does not exceed 65.C. After the addition of butyl acetate and 0.2% by weight tin dioctoate, the particular polyethylene glycol is added in portions with stirring. The mixture is then stirred at 60 to 70° C. until the NCO content is below 0.1% by weight. Colorless to light yellow, clear, highly viscous liquids are formed, partly crystallizing out after a short time.

TABLE 1

| Starting materials (mol) | B1 | B2 | B3 | B4 |
|---|---|---|---|---|
| Isophorone diisocyanate | 1.0 | 1.0 | | |
| Tolylene diisocyanate | | | 1.0 | |
| Trimerized hexamethylene dissocyanate (see A3) | | | | 1.0 |
| Hydroxyethyl acrylate | 1.0 | | | 2.1 |
| Propoxylated trimethylol propane diacrylate (see A2) | | 1.0 | 1.0 | |
| Polyethylene glycol (MW 1,000) | | 0.5 | | 0.45 |
| Polyethylene glycol (MW 1,550) | 0.5 | | 0.5 | |
| Solids content (%) | 90 | 90 | 90 | 80 |
| Ethylene oxide units, % by weight, based on solids: | 69.6 | 43.9 | 56.7 | 35.7 |
| Olefinic double bonds (MW = 24), based on solids: | 2.2 | 4.2 | 3.5 | 4.0 |

EXAMPLES

To prepare the emulsions, the quantities of hydrophobic polyurethanes A and hydrophilic polyurethanes B shown in Table 2 are mixed, the resulting mixtures are each sheared for 2 minutes with 110 g water in a dissolver at 8,000 r.p.m. and then adjusted with water while stirring (1,000 r.p.m.) to a solids content of 50%. Finely divided oil-in-water emulsions are formed.

TABLE 2

| | Example | | | | |
|---|---|---|---|---|---|
| Components (g) | 1 | 2 | 3 | 4 | 5 |
| A1 | 200 | | | | |
| A2 | | 200 | | | |
| A3 | | | 200 | 175 | |
| A4 | | | | | 200 |
| B1 | 50 | | | | 50 |
| B2 | | | 50 | | |
| B3 | | 50 | | | |
| B4 | | | | 75 | |
| Ethylene oxide units % by weight, based | 13.9 | 10.4 | 14.1 | 11.7 | 13.9 |

TABLE 2-continued

| Components (g) | Example 1 | 2 | 3 | 4 | 5 |
|---|---|---|---|---|---|
| on solids: | | | | | |
| Olefinic double bonds (MW = 24), % by weight, based on solids: | 3.0 | 8.6 | 7.0 | 6.6 | 5.5 |

COMPARISON EXAMPLES

COMPARISON EXAMPLE 1

Instead of separate preparation of the polyurethanes A4 and B1 (Example 5) and subsequent mixing, an "one-pot synthesis" was carried out:

116 g (1.0 mol) hydroxyethyl acrylate were added drop-wise over a period of 2 hours with stirring and cooling to 222 g (1.0 mol) isophorone diisocyanate and 0.5 g hydroquinone monomethyl ether at such a rate that the temperature does not exceed 65° C. After the addition of 0.5 g tin dioctoate and 98 g butyl acetate, 35 g (0.46 mol) 1, 2-propanediol and 60 g (0.04 mol) polyethylene glycol (MW 1,550) are added dropwise and the mixture stirred at 60 to 70° C. until the NCO content has fallen to below 0.1% by weight. A clear liquid (viscosity at 23° C.: 22,000 mPa.s) is formed. The content of olefinic double bonds is 5.5% by weight and the content of ethylene oxide units 13.9% by weight, corresponding to Example 5.

The product formed is sheared with water in a dissolver as in Examples 1 to 5, but could not be converted into an oil-in-water emulsion.

COMPARISON EXAMPLE 2

In order nevertheless to obtain water-dilutable products by "one-pot synthesis" (Comparison Example 1), the quantity of polyethylene glycol was increased. The procedure is exactly the same as in Comparison Example 1 except that 124 g (0.08 mol) rather than 60 g polyethylene glycol are used. To keep the molar percentage of OH groups constant, 32 g (0.42 mol) rather than 35 g 1, 2-propanediol are used. A clear liquid (viscosity at 23° C., 1,150 mPa.s) is formed. The content of olefinic double bonds is 4.9% by weight and the content of ethylene oxide units 25.1% by weight.

The product formed is sheared with water in a dissolver as in Examples 1 to 5 and adjusted to a solids content of 50%. An emulsion is formed, but cannot be diluted any further.

COMPARISON EXAMPLE 3

To show that the method of preparation of the hydrophilic polyurethanes B is crucial to the desired emulsifying effect, polyurethane B1 was not prepared in accordance with the invention:

The procedure is exactly the same as for the preparation of polyurethane Bl, except that the polyethylene glycol is first reacted with the diisocyanate and the hydroxyethyl acrylate is added thereafter.

A viscous product is formed and crystallizes out after a short time. If this product is mixed with polyurethane A4 as in Example 5 and sheared with water in a dissolver, a coarse oil-in-water emulsion is formed, separating after a few days.

APPLICATION EXAMPLES a) Peroxidic hardening

1% by weight of an aqueous cobalt acetate solution (5% by weight metal content) and 3% by weight tert.-butyl perbenzoate are added to the aqueous emulsions of Examples 1 to 5 and of Comparison Example 2 and the emulsions subsequently coated onto glass plates (wet film thickness: 90 μm).

These paint films are heated for 30 minutes at 125° C. The resistance of the hardened films to water was tested by wetting the films with water and evaluating them after a contact time of 16 hours at room temperature. Water-resistant means no visible changes in the film through staining, softening and separation of the film from the substrate.

The paint film surfaces of Examples 1 to 5 are water-resistant and scratch-resistant and have pendulum hardness values (according to König DIN 53 157) of more than 150 s. The paint film surface of Comparison Example 2 is neither water-resistant nor scratch-resistant and has a pendulum hardness of 100 s.

b) Photochemical hardening

Examples 1 to 5 and Comparison Example 2 are mixed before emulsification with quantities of 5 g photoinitiator (1, 4-isopropylphenyl)-2-hydroxy-2-methylpropan-1-one). After emulsification, the products are applied to a veneered chipboard in such a way that, after evaporation of the solvent, a dry film thickness of 30 μm is obtained. The board is moved past an overhead Hanovia lamp (80 W/cm, 10 cm distance) at a speed of 5 m/minute.

Only the paints of Examples 1 to 5 give coatings that are hard and resistant to scratching, water and chemicals. The paint of Comparison Example 2 shows inadequate water resistance and inadequate hardness.

What is claimed is:

1. The aqueous coating composition of claim 2 further comprising one or more paint additives.

2. An aqueous coating composition comprising a water-dispersible mixture of radically curable synthetic resins containing (meth)acryloyl groups, the mixture comprising:

A) 50 to 95 parts by weight of at least one non-water-dispersible polyurethane containing at least 2.5% by weight olefinic double bonds in the form of chemically incorporated (methacryloyl groups, at most 5% by weight of ethylene oxide units incorporated through polyethylene glycols and having a molecular weight between 500 to 5,000.

and

B) 5 to 50 parts by weight of at least one polyurethane having a content of (i) at least 1% by weight olefinic double bonds, and (ii) from 20–80% by weight ethylene oxide units incorporated through polyethylene glycol, said polyurethane being obtained by the reaction of
 a) 1.0 mol of a polyisocyanate component consisting of at least one organic polyisocyanate with
 b) 0.9 to 2.5 mol of an alcohol component containing (meth)acryloyl groups and consisting of at least one monohydric alcohol containing (meth-)acryloyl groups, and subsequent reaction of the reaction product formed from a) and b) with
 c) 0.25 to 0.55 mol of a polyethylene glycol component consisting of at least one polyethylene glycol at an NCO:OH equivalent ratio, based on all the starting components a) to c), maintained at 0.7:7 to 1.1:1, with the proviso that the total content in the mixture of ethylene oxides units emanating from component c) is at most 20% by weight and with the further proviso that components A) and B) are prepared separately before being mixed with each other.

* * * * *

UNITED STATES PATENT AND TRADEMARK OFFICE
CERTIFICATE OF CORRECTION

PATENT NO. : 5,095,066

DATED : March 10, 1992

INVENTOR(S) : Jürgen Meixner, et al

It is certified that error appears in the above-identified patent and that said Letters Patent is hereby corrected as shown below:

Column 10,

Renumber claim 1 as claim 2 and claim 2 as claim 1, and claim 2 depends from claim 1.

At Column 10, line 62 "0.7:7" should read -- 0.7:1 --.

Signed and Sealed this

Twenty-second Day of June, 1993

Attest:

Michael K. Kirk

MICHAEL K. KIRK

*Attesting Officer*

*Acting Commissioner of Patents and Trademarks*